(12) United States Patent
Just et al.

(10) Patent No.: US 7,845,704 B2
(45) Date of Patent: Dec. 7, 2010

(54) TRANSPARENT OUTER PANEL FOR A RETRACTABLE HARDTOP

(75) Inventors: Jan Just, Bloomfield Hills, MI (US); Robert E. Fallis, III, Rochester, MI (US)

(73) Assignee: Magna Car Top Systems, Troy, MI (US)

( * ) Notice: Subject to any disclaimer, the term of this patent is extended or adjusted under 35 U.S.C. 154(b) by 278 days.

(21) Appl. No.: 12/105,415

(22) Filed: Apr. 18, 2008

(65) Prior Publication Data

US 2008/0258491 A1 Oct. 23, 2008

Related U.S. Application Data

(60) Provisional application No. 60/912,461, filed on Apr. 18, 2007.

(51) Int. Cl.
*B60J 7/14* (2006.01)

(52) U.S. Cl. ............. 296/108; 296/107.07; 296/107.17; 296/215

(58) Field of Classification Search ................. 296/108, 296/116, 107.07, 107.17, 215
See application file for complete search history.

(56) References Cited

U.S. PATENT DOCUMENTS

| 4,219,230 | A | | 8/1980 | Lapine | |
|---|---|---|---|---|---|
| 4,729,592 | A | * | 3/1988 | Tuchiya et al. | .............. 296/116 |
| 4,891,913 | A | | 1/1990 | Shimura et al. | |
| 5,944,375 | A | * | 8/1999 | Schenk et al. | ............... 296/108 |
| 5,988,729 | A | * | 11/1999 | Klein | .................... 296/107.15 |
| 6,158,372 | A | | 12/2000 | Erskine | |
| 6,312,042 | B1 | | 11/2001 | Halbweiss et al. | |
| 6,513,864 | B2 | * | 2/2003 | Bohm et al. | ................. 296/214 |
| 6,648,397 | B2 | * | 11/2003 | Schutt et al. | ........... 296/107.16 |
| 6,669,278 | B2 | | 12/2003 | Patelczyk et al. | |
| 6,793,277 | B2 | | 9/2004 | Chon et al. | |
| 6,866,324 | B2 | * | 3/2005 | Neubrand et al. | .......... 296/108 |
| 6,913,310 | B2 | | 7/2005 | Albert | |
| 6,971,704 | B2 | * | 12/2005 | Cocaign | .................... 296/97.8 |
| 7,086,693 | B1 | * | 8/2006 | Huisman | .................... 296/215 |
| 2002/0074832 | A1 | | 6/2002 | Schutt et al. | |
| 2005/0104418 | A1 | | 5/2005 | Zirbs | |
| 2008/0030044 | A1 | * | 2/2008 | Schroder | ............... 296/107.17 |
| 2008/0093880 | A1 | * | 4/2008 | Westermann et al. | .. 296/107.17 |

FOREIGN PATENT DOCUMENTS

DE 10340622 A1 * 12/2004

* cited by examiner

*Primary Examiner*—Jason S Morrow
(74) *Attorney, Agent, or Firm*—Brooks Kushman P.C.

(57) ABSTRACT

A retractable vehicle hardtop has a predominantly transparent top roof panel and a predominantly transparent combined back light/sail panel. The panels are attached to a top stack linkage that is used to retract and extend the hardtop. The top roof panel and combined back light/sail panel each feature a smooth, continuous two-part retractable hardtop that provides panoramic overhead views both when retracted and when extended. A frame is assembled to opaque peripheral portions of the top roof panel. Reinforcement bars are assembled to opaque portions of the combined back light/sail panel. A method of making the retractable hardtop.

16 Claims, 5 Drawing Sheets

TRANSPARENT OUTER PANEL FOR A RETRACTABLE HARDTOP

CROSS-REFERENCE TO RELATED APPLICATIONS

This application claims the benefit of U.S. provisional application Ser. No. 60/912,461 filed Apr. 18, 2007.

BACKGROUND OF THE INVENTION

1. Field of the Invention

The present invention relates to providing one or more predominantly transparent panels that are secured to a top stack linkage to form a retractable hardtop for a vehicle.

2. Background Art

Vehicle roof styles include hardtops, hardtops with a sunroof, soft top convertibles and retractable hardtop convertibles. Convertibles are popular alternatives to conventional hardtops and hardtops with sunroofs with vehicle owners who want an unobstructed overhead view and maximum ventilation.

Soft top convertibles are formed by-in-large by an opaque fabric that may have a back light formed of glass or plastic. When a soft top is extended to cover the passenger compartment, no overhead view is provided. Soft top convertibles do not reduce noise to the same extent as a hardtop or a retractable hardtop.

A retractable hardtop provides the best features of both the fixed hardtop and the soft top convertible. Retractable hardtops, when retracted fully, open the passenger compartment to provide an unobstructed overhead view. Retractable hardtops in the closed position provide noise reduction that is comparable to conventional hardtops. However, when the retractable hardtop is closed, overhead view is lost just as it is with a soft top convertible.

The present invention is directed to providing retractable hardtop that provides excellent overhead visibility and permits the passenger compartment to be illuminated by natural light through the roof.

SUMMARY OF THE INVENTION

At least one transparent outer panel is provided for a retractable hardtop for a vehicle that may be retracted by a linkage system. At least two transparent outer panels may be folded into a stored position in either a storage compartment located above the vehicle trunk or within the vehicle trunk. Smooth continuous transparent outer panels provide panoramic views and may be designed to require less storage space than a convertible soft or a retractable hardtop that has thicker retractable hardtop panels.

According to one aspect of the present invention, a retractable hardtop for a vehicle is provided. The retractable hardtop comprises a plurality of roof panels that are connected together to form a roof for the vehicle that covers a passenger compartment in the extended position and is stored behind the passenger compartment in a retracted position. A top stack linkage connects the panels together and to the vehicle. The top stack linkage is operable to move the roof panels between the extended and retracted positions. At least one of the roof panels is predominantly transparent. As used herein the term "predominantly" should be understood to mean more than 60%.

According to other aspects of the present invention, the plurality of roof panels may further comprise a first roof panel and a second roof panel that are both predominantly transparent. Both of the roof panels may have a transparent central portion that is bordered by an opaque area. The first roof panel may have a frame that is assembled to the opaque area of the first roof panel, while the second roof panel has a plurality of reinforcement members that are assembled to the opaque area of the second roof panel.

According to other aspects of the invention, the top stack linkage may be secured to the frame of the first roof panel and to the second roof panel between the first roof panel of the vehicle. The second roof panel may have a sail panel portion that is located in the opaque area of the second roof panel. The top stack linkage may include a link that is pivotally secured to the first roof panel on an upper end and to the vehicle on a lower end. The link is fixedly secured to the sail panel portion between the upper and lower ends. The frame of the first roof panel may have a right bar, a left bar, a front bar and a rear bar. The top stack linkage may be secured to the right and left bars and the reinforcement members of the second roof panel include an upper reinforcement assembled to an upper portion of the second panel and a lower reinforcement assembled to a lower portion of the second roof panel.

According to another aspect of the present invention, a retractable hardtop assembly is provided for a vehicle. The retractable hardtop assembly comprises a top roof panel formed by a first partially clear rigid panel wherein the top roof panel defines a skylight portion. A combined back light and sail panel having a back light portion and a pair of sail panel portions form part of a second partially clear rigid panel that is aligned with and disposed rearward of the top roof panel in an extended roof position. A roof frame is attached to the top roof panel. An upper crossbar and a lower crossbar are attached to the combined back light and sail panel. The crossbars extend transversely across the top edge of the back light portion and a bottom edge of the back light portion. A top stack linkage has a right side linkage and a left side linkage. The side linkages each include a main pivot bracket that is assembled to the vehicle. A main link is attached to the main pivot bracket on a lower end and one side of the side roof frame member on an upper end. A balance link is attached to the main pivot bracket on the lower end and to one end of the side roof frame members on an upper end. The balance link is attached in a fixed relationship to the sail panel at a location intermediate the upper and lower ends of the balance link.

According to other aspects of the invention, the roof frame may include a plurality of bars that are secured to the top roof panel around a skylight portion of the top roof panel. The top roof panel may have an opaque peripheral portion that is provided on the top roof panel and extends around the skylight portion to conceal the bars of the roof frame. The back light portion is a transparent portion of the combined back light and sail panel that is disposed between the sail panels. A ridge may be provided on each of the right and left sides of the top roof panel flanking the skylight and on each of the right and left sides of the combined back light and sail panel flanking the back light portion. The ridges extend in a fore-and-aft direction to channel water toward the rear of the vehicle. The retractable hardtop may be manually moved between an extended position and a retracted position. The top roof panel and combined back light and sail panel may be molded from polycarbonate plastic or may be formed glass panels.

According to another aspect of the present invention, a method of making a retractable hardtop for a vehicle is disclosed. The method comprises molding a top roof panel to form a skylight that is flanked by right and left roof rail linkage cover portions. A combined back light and sail panel are molded to form a back light that is flanked by right and left sail panel portions. A roof frame is assembled to the top roof panel. A top stack linkage is assembled to the top roof panel on one end and to the vehicle on another end. The combined back light and sail panel are assembled to the top stack linkage between the two ends of the top stack linkage.

According to other aspects of the method of the present invention, the step of assembling the combined back light and sail panel to the top stack may further comprise adhering the combined back light and sail panel to the top stack linkage with an adhesive. The step of molding the top roof panel may further comprise molding a polycarbonate sheet to form the roof rail cover portions. The step of molding the top roof panel may also further comprise molding the polycarbonate sheet to form a ridge between the skylight and roof rail cover portion of the top roof panel. The step of molding the combined back light and sail panel may further comprise molding a polycarbonate sheet to form the right and left sail panel portions integrally with the back light. The step of molding the combined back light and sail panel may further comprise molding the polycarbonate sheet to form a ridge between the right and left sail panel portions and the back light.

These and other aspects of the present invention will be better understood in view of the attached drawings and detailed description of several embodiments of the invention that follows.

DETAILED DESCRIPTION OF THE PREFERRED EMBODIMENT(S)

Figure 1:
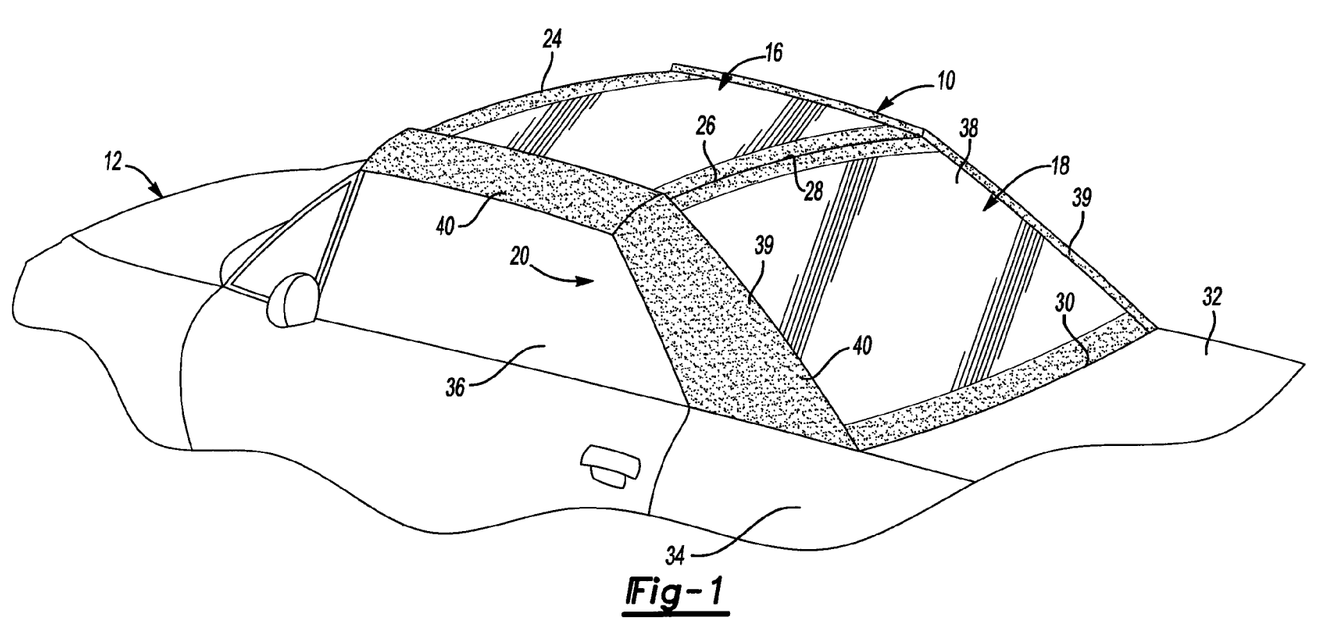
FIG. 1 is a perspective view of a retractable hardtop assembly having transparent outer panels in the covered position.

Referring to FIG. 1, a retractable hardtop 10 is shown in its extended, or covering, position on a vehicle 12. The retractable hardtop 10 includes a top roof panel assembly 16 and a combined back light/sail panel assembly 18. The retractable hardtop 10 covers the passenger compartment 20 of the vehicle 12.

The top roof panel assembly 16 has a front edge 24 and a rear edge 26. An upper edge 28 of the back light/sail panel assembly 18 abuts the rear edge 26 of the top roof panel assembly 16. A seal (not shown) that may be a one-piece seal assembly or a two-part mating seal assembly is provided between the rear edge 26 and upper edge 28. A lower edge 30 of the back light/sail panel assembly 18 is in contact with the rear deck 32 that also may be the deck lid of vehicle 12.

The vehicle 12 has a quarter panel 34 on both sides of the vehicle flanking the rear deck 32. A side window 36 is part of the vehicle 12 and spans the area below the top roof panel assembly 16 and in front of the back light/sail panel assembly 18. The back light/sail panel assembly 18 has a back light 38 that comprises a transparent portion of the back light/sail panel assembly 18 that is flanked by two sail panel portions 39.

Blackout paint areas 40 are provided at portions of the periphery of the top roof panel assembly 16 and back light/sail panel assembly 18.

Figure 2:
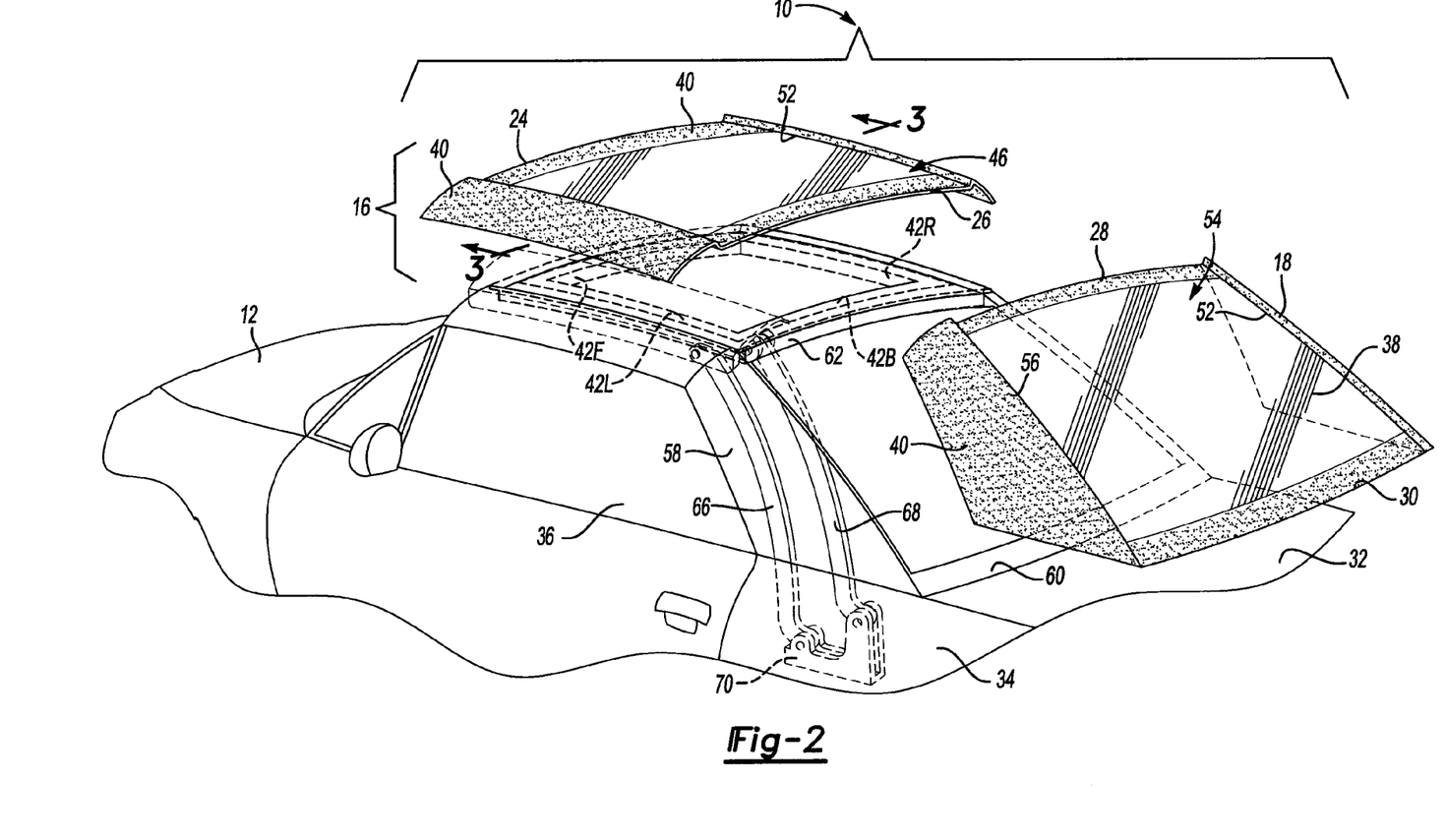
FIG. 2 is an exploded view of the retractable hardtop assembly shown in FIG. 1.
Figure 3:
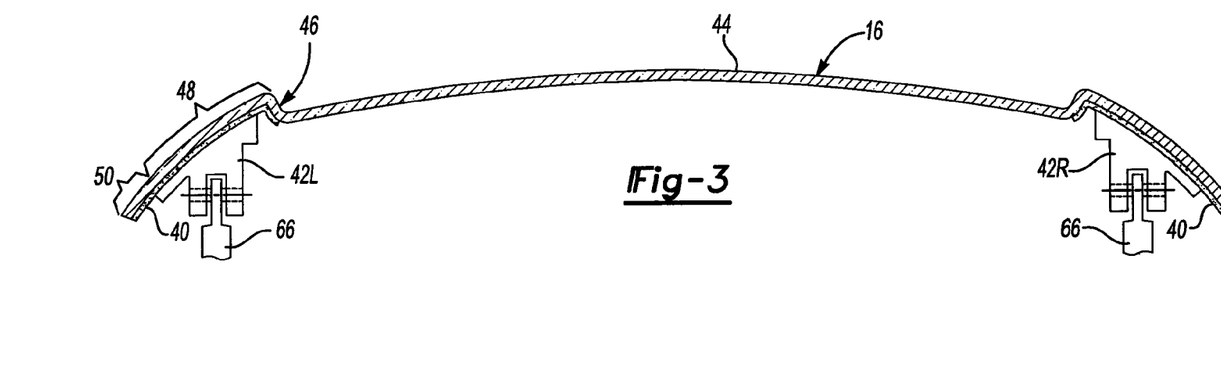
FIG. 3 is a cross-sectional view taken along the line 3-3 in FIG. 2.

Referring to FIGS. 2 and 3, the top roof panel assembly 16 is shown to include a top roof frame 42 that is secured to the top roof panel assembly 16 around a skylight 44 that is formed by a transparent portion of a top glass panel 46. The roof frame 42 includes a right bar 42R, a left bar 42L, a front bar 42F, and a back bar 42B. As used herein, the term glass includes glass and glass-like materials, such as clear polycarbonate and the like. The top roof panel assembly 16 has a roof rail linkage cover portion 48 that extends over a side portion of the top roof frame 42. An overlying extension 50 extends laterally outboard of the roof rail linkage cover 48. A ridge 52 is provided along the right and left sides of the skylight 44 that function to channel water toward the rear of the vehicle.

Referring specifically to FIG. 3, the top roof panel assembly 16 is shown as it is attached to the top roof frame 42. The top roof frame 42 is secured to the roof rail linkage cover 48 as shown with the blackout paint areas 40 being applied to the inner surface of the top glass panel 46 that provides a decorative appearance from the exterior and also precludes visibility of the top roof frame 42. The top glass panel 46 forms the roof rail linkage cover 48 and the overlying extension 50 that extends outboard of the linkage cover 48. The blackout paint area 40 spans the roof rail linkage cover 48 and the overlying extension 50 of the top glass panel 46.

Referring back to FIG. 2, the ridge 52 extends fore and aft on the right and left sides of both the top roof panel assembly 16 and the back light/sail panel assembly 18. The ridge 52 functions as a drip guard to channel water from the top roof panel assembly 16 and back light/sail panel assembly 18 away from the sides of the panels. Rain falling on the roof tends to flow in a rearward direction due to the angular orientation of the panels 16 and 18 and also flows rearwardly when the vehicle is driven.

A back glass panel 54 forms part of the back light/sail panel assembly 18. The back glass panel 54 includes flanking sail panel covers 56 that completely encase the sail panel area of the vehicle 12. The back light/sail panel assembly 18 may also include a sail panel inner frame member 58 to which the back glass panel 54 may be secured. The sail panel inner frame member 58 on the right and left sides of the vehicle 12 are interconnected by a lower crossbar 60 and an upper crossbar 62. The back glass panel 54 covers the sail panel inner frame members 58 and the upper and lower cross bars 60 and 62.

The kinematic linkage, or top stack linkage 64, includes a main link 66 and a balance link 68 that are both connected to a main pivot bracket 70. Pivot joints 72 are provided to connect the main link 66 and balance link 68 to the main pivot bracket 70. Other pivot joints 72 are provided on the top roof frame 42 to connect the main link 66 and balance link 68 to the top roof panel assembly 16.

Figure 4:
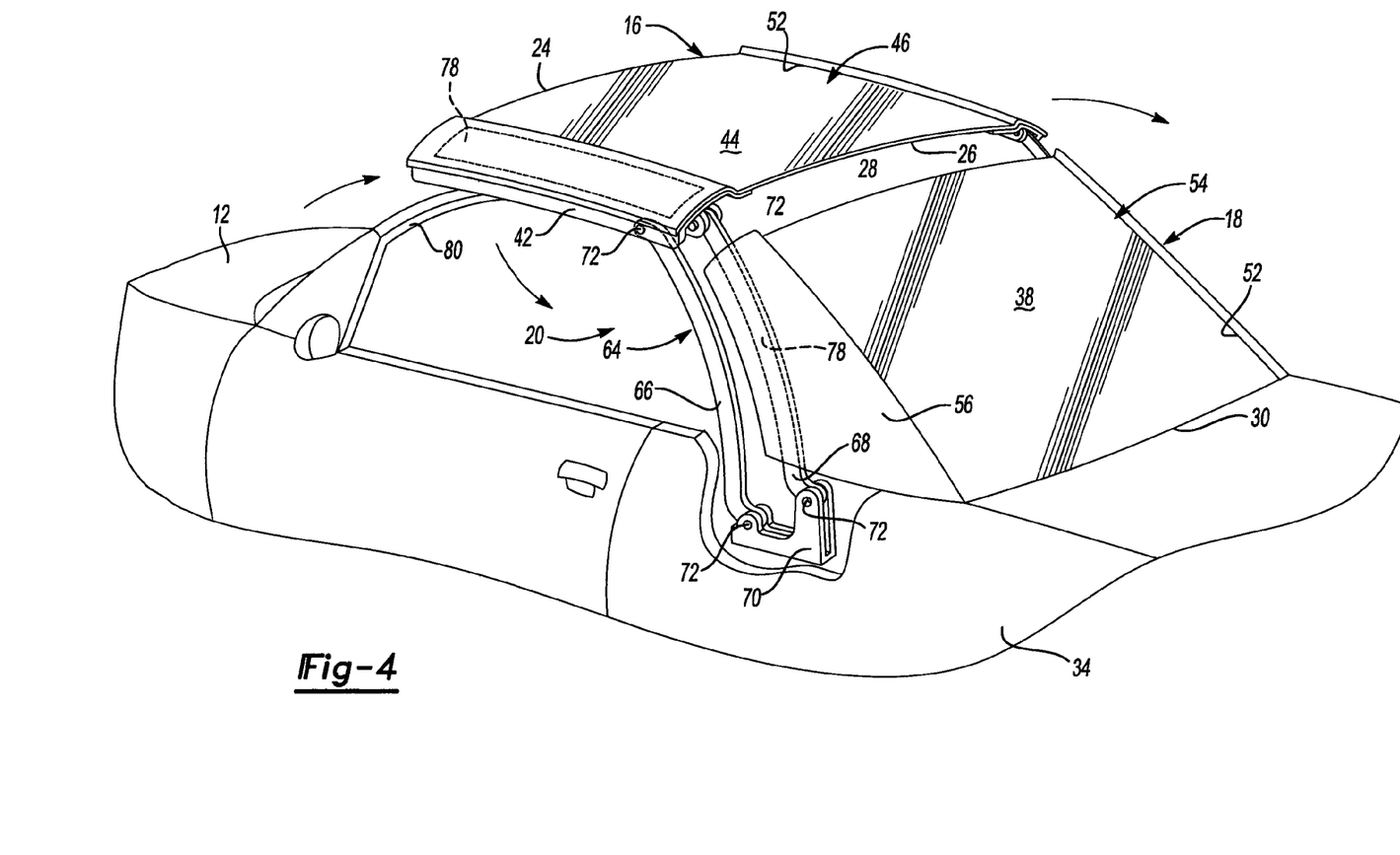
FIG. 4 is a rear/side perspective of the retractable hardtop assembly in a partially opened position.

Referring to FIG. 4, the retractable hardtop 10 is shown in a nearly fully extended position as it would appear in the beginning of a retraction cycle or at the end of the extension cycle. The top roof panel assembly 16 is separated from the back light/sail panel assembly 18. The top glass panel 46 defines the exterior surface of the top roof panel assembly 16. The top glass panel is secured to the top roof frame 42 on opposite lateral sides. The top roof frame 42 is preferably bonded by an adhesive at a bond path 78 to the top glass panel 46. The vehicle 12 has a windshield header 80. The front edge 24 engages the windshield header 80 when the roof is fully extended. The rear edge 26 of the top roof panel assembly 16 is separated from the upper edge 28 of the back light/sail panel assembly 18 as shown in FIG. 4. The main link 66 extends between the main pivot bracket 70 and the top roof frame 42 and is connected by pivot joints 72 on opposite ends thereof. The balance link 68 is bonded, or otherwise fixedly secured, to the sail panel cover 56 or the sail panel inner frame member 58 in the area of the bond path 78 shown in phantom lines in FIG. 4. The back light/sail panel assembly 18 is fixed relative to the balance link 68 so that the back light/sail panel assembly 18 moves with the balance link 68. A back light 38 is formed by an unpainted area of the transparent back glass panel 54 between the blackout paint areas 40 that are outboard of the ridges 52.

Figure 5A:
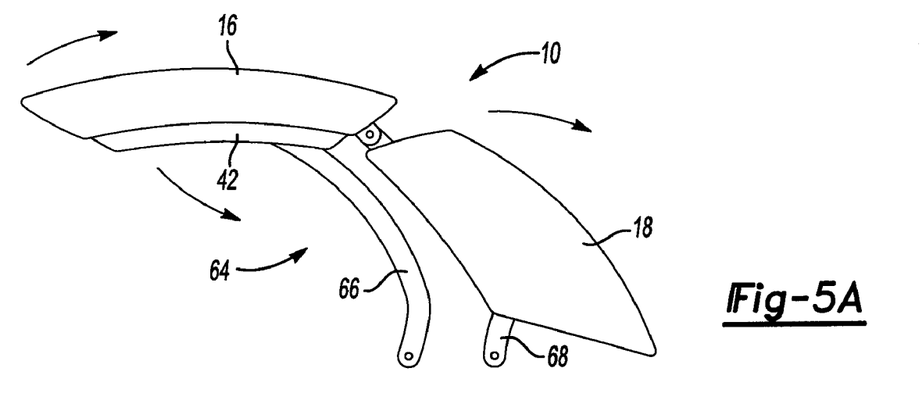
FIG. 5A is a side elevation view of the retractable hardtop assembly shown in a slightly retracted position generally corresponding to the extent of retraction of the top shown in FIG. 4.
Figure 5B:
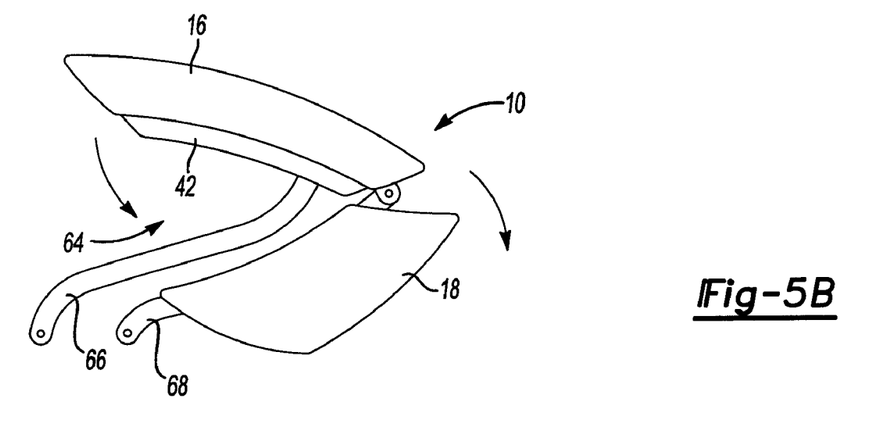
FIG. 5B is a side elevation view of the retractable hardtop assembly showing a linkage supporting the transparent roof panels retracted to a mid retraction cycle position.
Figure 5C:
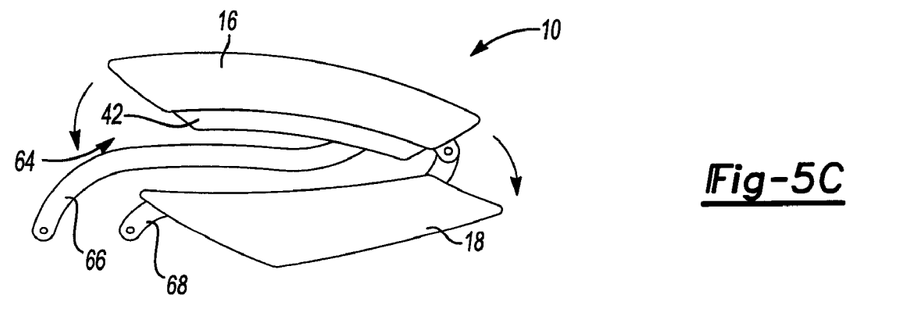
FIG. 5C is a side elevation view of the retractable hardtop assembly showing a linkage supporting the transparent roof panels in a substantially fully retracted position.

Referring to FIGS. 5A-C, the retraction motion of the retractable hard top 10 by the top stack linkage 64 is shown in sequence. In FIG. 5A, the top is in a position generally corresponding to the position shown in FIG. 4. The top roof panel assembly 16 and top roof frame 42 are raised by the main link 66 and balance link 68 and rotated in a generally rearward vehicle direction as shown by the arrows in FIG. 5A. The top roof panel assembly 16 is spaced from the back light/sail panel assembly 18. In FIG. 5B, the retractable hardtop 10 is shown in its mid-cycle position with the top roof panel assembly 16 and top roof frame 42 disposed over the back light/sail panel assembly 18. The main link 66 and balance link 68 move the top roof panel assembly 16 in a rearward direction to this position. FIG. 5C shows the retractable hardtop 10 in its nearly fully retracted position. The top roof panel assembly 16 is shown being lowered towards the back light/sail panel assembly 18 by the main link 66 and balance link 68. The retractable hardtop 10 may be manually moved between the extended and retracted roof positions.

Figure 6:
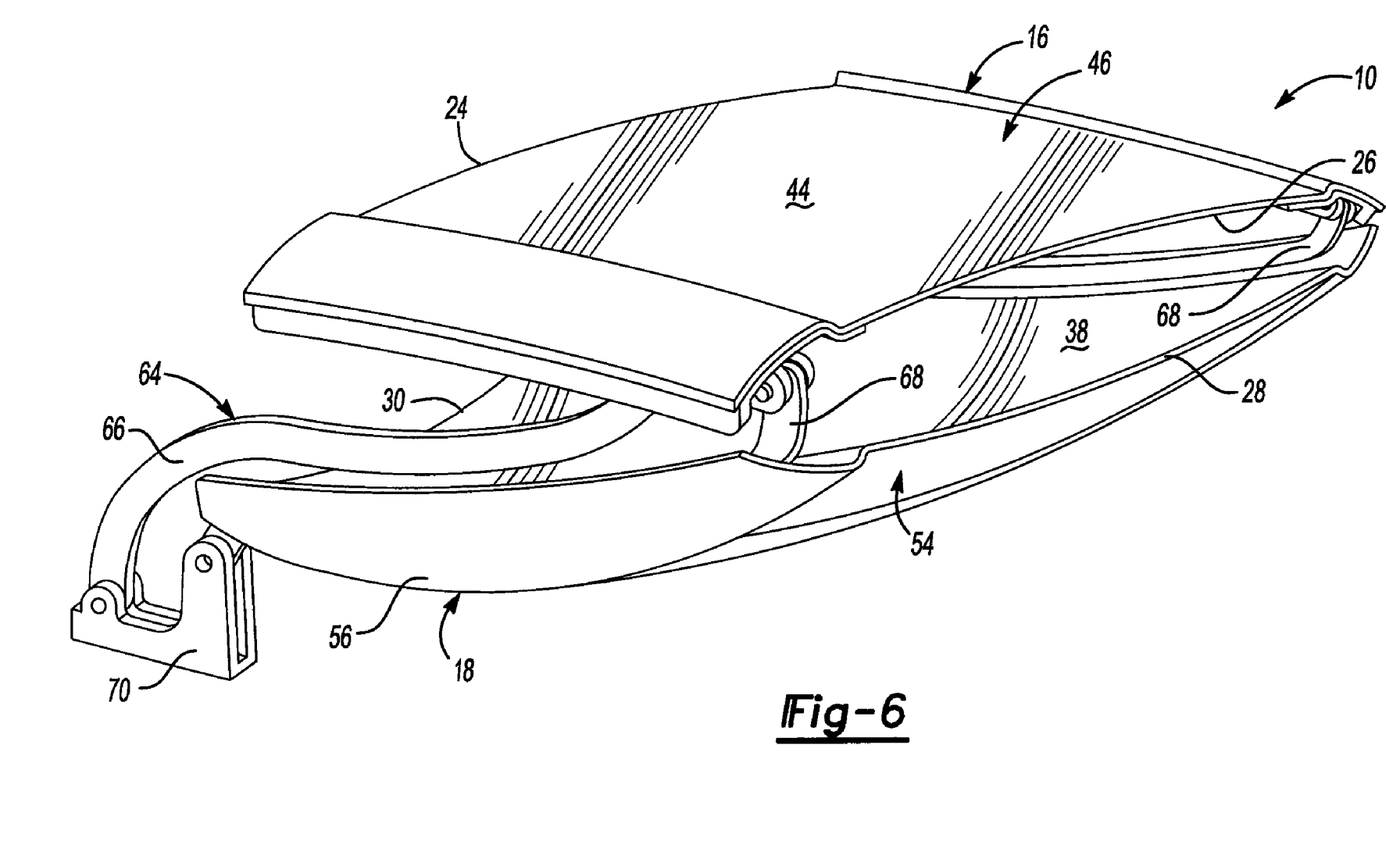
FIG. 6 is a rear/side perspective view showing the linkage supporting the transparent roof panels fully retracted.

Referring to FIG. 6, the retractable hardtop 10 is shown in perspective in a position corresponding generally to that shown in FIG. 5C. As shown in FIG. 6, the top roof panel assembly 16 has a skylight 44 that is bounded fore-and-aft by the front edge 24 and rear edge 26. The front edge 24 of top roof panel assembly 16 is generally above the lower edge 30 of the back light/sail panel assembly 18, while the rear edge 26 of top roof panel assembly 16 is generally above the upper edge 28 of the back light/sail panel assembly 18. The roof is supported on the main pivot links 66 and balance links 68 with the top panel assembly 16 being in a generally clamshell orientation relative to the back light/sail panel assembly 18. The back light/sail panel assembly 18 defines a back light 38 that comprises an unpainted or transparent portion of the back glass panel 54.

The method of making a retractable hardtop 10 for a vehicle 12 comprises molding a top roof panel 16 to form a skylight 44 that is flanked by right and left roof rail linkage cover portions 48. The molding step may include, for example, molding in a vacuum forming process, molding a sheet material compound, or heating and forming a glass sheet. A combined back light and sail panel 18 are molded to form a back light 38 that is flanked by right and left sail panel portions 39. A roof frame 42 is assembled to the top roof panel 46. A top stack linkage 64 is assembled to the top roof panel 46 on one end and to the vehicle 12 on another end. The combined back light and sail panel 18 are assembled to the top stack linkage 64 between the two ends of the top stack linkage 64.

According to other aspects of the method of the present invention, the step of assembling the combined back light and sail panel 18 to the top stack 64 may further comprise adhering the combined back light and sail panel 18 to the top stack linkage 64 with an adhesive. The step of molding the top roof panel may further comprise molding a polycarbonate sheet by any known method for molding such sheets to form the roof rail cover portions 48. The step of molding the top roof panel 46 may also further comprise molding the polycarbonate sheet to form a ridge 52 between the skylight 44 and roof rail cover portion 48 of the top roof panel 46. The step of molding the combined back light and sail panel 18 may further comprise molding a polycarbonate sheet to form the right and left sail panel portions 39 integrally with the back light 38. The step of molding the combined back light and sail panel 18 may further comprise molding the polycarbonate sheet to form a ridge 52 between the right and left sail panel portions 39 and the back light 38.

While several embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

We claim:

1. A retractable hardtop for a vehicle comprising:
   a plurality of roof panels connected together to form a roof for the vehicle that covers a passenger compartment in an extended position and that is stored behind the passenger compartment in a retracted position wherein the plurality of roof panels further comprise a first roof panel and a second roof panel and wherein both of the roof panels are predominantly transparent, and wherein one of a first set of ridges is each provided on one of the right and left sides of the first roof panel, and wherein one of a second set of ridges is each provided on one of the right and left sides of the second roof panel; and
   a top stack linkage that connects the panels together and to the vehicle, the top stack linkage being operable to move the roof panels between the extended position and the retracted position.

2. The retractable hardtop assembly of claim 1 wherein both of the roof panels have a transparent central portion that is at least partially bordered by an opaque area.

3. The retractable hardtop assembly of claim 2 wherein the first roof panel has a frame that is assembled to the opaque area of the first roof panel, and the second roof panel has a plurality of reinforcement members that are assembled to the opaque area of the second roof panel.

4. The retractable hardtop assembly of claim 3 wherein the top stack linkage is secured to the frame of the first roof panel and to the second roof panel between the first roof panel and the vehicle, the second roof panel having a sail panel portion that is located in the opaque area of the second roof panel, the top stack linkage includes a link that is pivotally secured to the first roof panel on an upper end and to the vehicle on a lower end, and wherein the link is fixedly secured to the sail panel portion between the upper and lower ends.

5. The retractable hardtop assembly of claim 3 wherein the frame of the first roof panel has a right bar, a left bar, a front bar, and a back bar, wherein the top stack linkage is secured to the right and left bars, and the reinforcement members of the second roof panel include an upper reinforcement assembled to an upper portion of the second panel and a lower reinforcement assembled to a lower portion of the second roof panel.

6. A retractable hardtop assembly for a vehicle comprising:
   a top roof panel formed by a first partially clear rigid panel, the top roof panel defining a skylight portion wherein a top roof panel ridge is provided on each of the right and left sides of the top roof panel flanking the skylight portion;

a combined back light and sail panel having a back light portion and a pair of sail panel portions that are part of a second partially clear rigid panel that is aligned with and disposed rearward of the top roof panel in an extended roof position and wherein on each of the right and left sides of the combined back light and sail panel flanking the back light portion, wherein the ridges extend in a fore-and-aft direction to channel water toward the rear of the vehicle;

a roof frame attached to the top roof panel, wherein the roof frame includes at least two side roof frame members;

an upper cross bar and a lower cross bar attached to the combined back light and sail panel that extend transversely along the a top edge of the back light portion and a bottom edge of the back light portion; and a top stack linkage having a right side linkage and a left side linkage, wherein each of the right and left side linkages each include a main pivot bracket assembled to the vehicle, a main link attached to the main pivot bracket on a lower end and one of the side roof frame members on an upper end, and a balance link attached to the main pivot bracket on a lower end, one of the side roof frame members on an upper end, and wherein the balance link is attached in a fixed relationship to the sail panel intermediate the upper end and the lower end.

7. The retractable hardtop assembly of claim 6 wherein the roof frame includes a plurality of bars that are secured to the top roof panel around a skylight portion of the top roof panel.

8. The retractable hardtop assembly of claim 7 wherein the top roof panel has an opaque peripheral portion that is provided on the top roof panel and that extends around the skylight portion and conceals the bars of the roof frame.

9. The retractable hardtop assembly of claim 6 wherein the back light portion is a transparent portion of the combined back light and sail panel that is disposed between the sail panels.

10. The retractable hardtop assembly of claim 6 wherein the retractable hardtop is manually moved between an extended position and a retracted position.

11. The retractable hardtop assembly of claim 6 wherein the top roof panel and the combined back light and sail panel are molded polycarbonate plastic panels.

12. The retractable hardtop assembly of claim 6 wherein the top roof panel and the combined back light and sail panel are formed glass panels.

13. A method of making a retractable hardtop for a vehicle comprising:
   molding polycarbonate sheet to form a top roof panel to form a sky light that is flanked by right and left roof rail linkage cover portions and form a ridge between the skylight and the roof rail cover portions;
   molding a combined back light and sail panel to form a back light that is flanked by right and left sail panel portions and form a ridge between the skylight and the roof rail cover portions;
   assembling a roof frame to the top roof panel;
   assembling a top stack linkage to the top roof panel on one end and to the vehicle on another end;
   assembling the combined back light and sail panel to the top stack linkage between the two ends of the top stack linkage.

14. The method of claim 13 wherein the step of assembling the combined back light and sail panel to the top stack further comprises adhering the combined back light and sail panel to a pair of sail panel inner frames, an upper cross bar and a lower cross bar.

15. A method of making a retractable hardtop for a vehicle comprising:
   molding a top roof panel to form a sky light that is flanked by right and left roof rail linkage cover portions;
   molding a combined back light and sail panel to form a back light that is flanked by right and left sail panel portions;
   assembling a roof frame to the top roof panel;
   assembling a top stack linkage to the top roof panel on one end and to the vehicle on another end;
   assembling the combined back light and sail panel to the top stack linkage between the two ends of the top stack linkage; and
   wherein the step of molding the combined back light and sail panel further comprises molding a polycarbonate sheet to form the right and left sail panel portions integrally with the back light.

16. The method of claim 15 wherein the step of molding the combined back light and sail panel further comprises molding the polycarbonate sheet to form a ridge between the right and left sail panel portions and the back light.

* * * * *

UNITED STATES PATENT AND TRADEMARK OFFICE
CERTIFICATE OF CORRECTION

PATENT NO. : 7,845,704 B2  
APPLICATION NO. : 12/105415  
DATED : December 7, 2010  
INVENTOR(S) : Jan Just Page 1 of 1

It is certified that error appears in the above-identified patent and that said Letters Patent is hereby corrected as shown below:

Column 7, Line 18, Claim 6:

After "transversely along"  
Delete "the"

Signed and Sealed this  
First Day of March, 2011

David J. Kappos  
*Director of the United States Patent and Trademark Office*